Dec. 2, 1952
A. E. CHURCH
2,620,196
PNEUMATIC COLLET CHUCK CLOSER
Filed Feb. 14, 1948
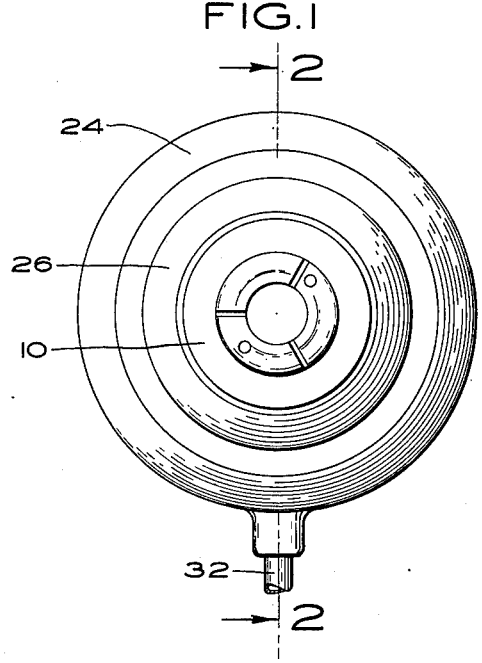
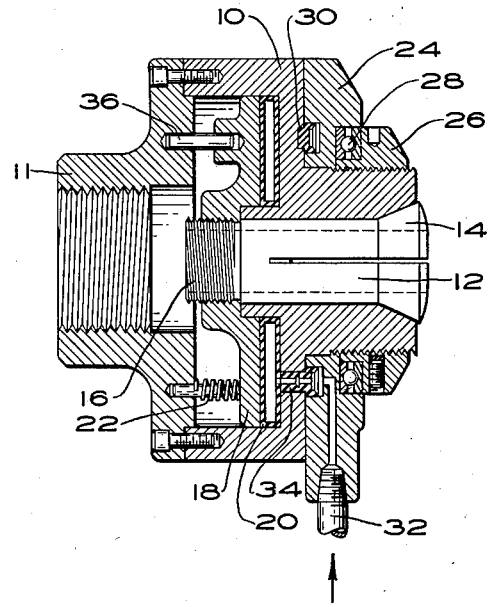
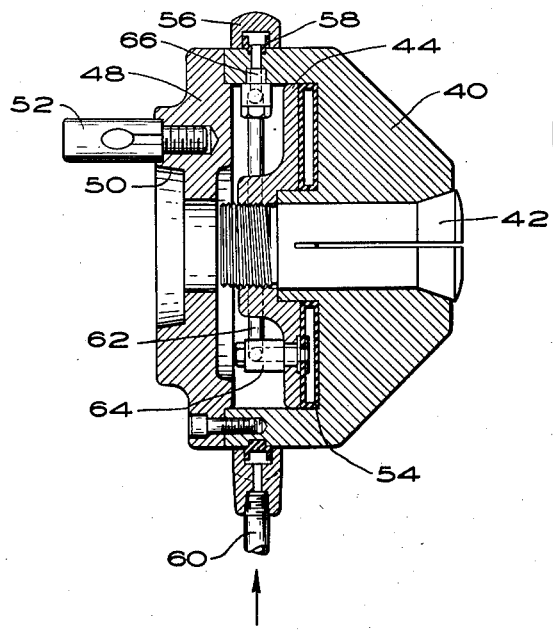
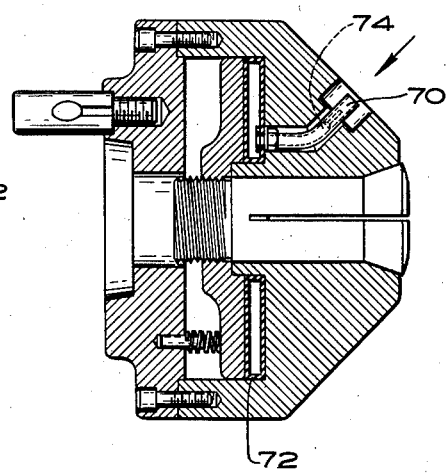
INVENTOR
A. E. CHURCH
BY Joseph K. Schofield
ATTORNEY Patented Dec. 2, 1952

2,620,196

UNITED STATES PATENT OFFICE 2,620,196

PNEUMATIC COLLET CHUCK CLOSER

Albert E. Church, New Britain, Conn., assignor to Union Manufacturing Company, New Britain, Conn., a corporation of Connecticut Application February 14, 1948, Serial No. 8,478

5 Claims. (Cl. 279—4)

1

This invention relates to collet chucks adapted primarily for application to rotatable machine tool spindles and more particularly to pneumatic means for closing chucks of the collet type.

An object of the present invention is to provide a convenient and simple form of expansible chamber type of closing means for work holding collets, the collet being attached to a member moved in a direction to close the collet when air or gas under pressure is admitted to the expansible chamber formed by a flexible impervious annular member.

A feature of importance of the invention is that air or gas under pressure may be supplied to the chuck by a detachable connection to a flexible supply tube or by a permanent non-rotatable collar which may be mounted rotatably on the chuck and to which an air or gas supply may be connected.

With the above and other objects in view the invention may include the features of construction and operation set forth in the following specification and illustrated in the accompanying drawing.

In the accompanying drawing annexed hereto and forming a part of this specification, I have shown the invention embodied in several collet chucks for application to the work rotating spindle of small machine tools such as lathes, but it will be understood that the invention can be otherwise embodied and that the drawing is not to be construed as defining or limiting the scope of the invention, the claims appended to this specification being relied upon for that purpose.

In the drawing:

Fig. 1 is a front elevation of a collet type chuck embodying the present invention;

Fig. 2 is a longitudinal central sectional view of the chuck shown in Fig. 1 taken on the plane of line 2—2;

Figs. 3 and 4 are views corresponding to Fig. 2 and showing slightly modified forms of operating means for the collet member of a work clamping and rotating chuck.

In the above mentioned drawing there have been shown several embodiments of the invention which are now deemed preferable, but it is to be understood that changes and modifications may be made within the scope of the appended claims without departing from the spirit of the invention.

Briefly, and in its preferred form, the invention may include the following principal parts: First, a body member adapted for mounting on the end of a rotatable spindle of a machine tool; second, a spring collet member movable axially within the body member and having a tapered portion engaging a correspondingly tapered portion of the body member so that movement of the collet in one direction will compress portions of the collet on a work piece or member positioned within the axial opening extending through the collet; third, a disk detachably and preferably adjustably attached to the inner end of the collet member as by threaded means and slidable within a recess formed within the body member; fourth, an inflatable flexible and impervious member within the body member and having a surface in contact with the disk attached to the collet; and fifth, means to admit air or gas under pressure to within said inflatable member to force the disk in a direction to close the collet.

Referring more in detail to the figures of the drawing and first to the form of the invention shown in Figs. 1 and 2, there is provided a body member 10 adapted for attachment to a rotatable spindle (not shown). In Fig. 2 a threaded connection is shown formed on the back plate 11 for mounting the body member 10 of the chuck on the threaded nose of a machine tool spindle. The body member 10 and back plate 11 are detachably but rigidly secured together and the chuck extends in alignment with the axis of the threaded connection. Within the body member 10 is a spring collet member 12 of the usual or standard form. As shown the collet member 12 is split longitudinally for a portion of its length at several angularly disposed positions so that slight longitudinal movement of the collet member 12 will force a conical portion 14 at its forward end into contact with the tapered end of the recess provided in the body member 10 for the collet member.

At the inner end of the collet member 12 are provided screw threads 16 for detachably connecting a disk 18 slidable within the recessed portion of the body member 10. Disposed between the forward face of the disk 18 and a wall of the body member 10 is an inflatable impervious member 20 preferably formed of flexible material such as rubber or rubber substitute. As shown this member 20 is in the form of a hollow annulus one side face being in contact with a wall of the body member 10 and the opposite face engaging a side face of the disk 18. By inflating the impervious member 20 the disk 18 is forced in a direction to correspondingly move the collet member 12 in a closing direction. To return the disk 18 and collet member 12 to their open position one or more springs 22 may be provided.

To admit air or gas to the interior of the member 20 a collar 24 may be mounted for rotation around the forward end of the body member 10. One face of the collar 24 bears against a forward face of the body member 10 and is held in position against said face by a nut 26 threaded over the forward threaded end of the body member. Between the collar 24 and nut 26 may be provided an anti-friction bearing 28 to reduce friction. Also to maintain a pressure tight seal between the body member 10 and collar 24 an annular flanged sealing ring 30 may be housed in mating grooves in the body member and collar.

An air or gas supply connection 32 is attached to the collar 24 and a conduit leads therefrom to the groove for the sealing ring 30. The sealing ring 30 is perforated at this point so that air or gas may enter the inflatable member 20 through a short nipple 34 of any usual type in alignment with the perforation in the ring 30. As shown in Fig. 2 the sealing ring 30 is provided within the annular groove in the collar 24 with peripheral flanges on its inner and outer edges, these flanges engaging the walls of the groove within the collar 24 in pressure tight relation while permitting rotation of the collar relative to the body member. By admitting air or gas under pressure to the connection 32 the inflatable member 20 will be extended to force the disk 18 and collet member 12 in a direction to close the collet. By opening the connection 32 to atmosphere and releasing pressure within the inflatable member 20 springs 22 will force the disk 18 and collet member 12 in a direction to open the collet. To prevent rotation of the disk 18 within the body member 10 and to permit adjustment of the collet member 12 a stud 36 may be positioned within the back plate 11 of the chuck and entering an opening within the disk 18. To adjust the position of the disk 18 on the threaded end of the collet member it is only necessary to rotate the collet 12 in the body member 10 by means of a tool inserted in openings in the front face of the collet.

The modified form of the invention shown in Fig. 3 has a body member 40, collet member 42 and disk 44 similar in every way to the corresponding parts shown in Figs. 1 and 2. The back plate 48 however is provided for attachment to a different form of spindle. This back plate as shown is provided with a central tapered recess 50 and with a plurality of cam locking studs 52 but one of which is shown.

To admit air or gas under pressure to the inflatable member 54 a collar 56 is rotatably mounted on the outside cylindrical surface of the body member 40. A sealing ring 58 positioned within an annular recess in the periphery of the body member 40 has its flanges engaging the side walls of a circular recess in the collar 56. A supply connection 60 leading into the collar 56 permits air or gas under pressure to be admitted to the groove in the collar 56 and through a tubular connection 62 within the body member 40 through the disk 44 and to the interior of the inflatable member 54. Nipples 64 and 66 at opposite ends of the conduit maintain pressure tight connections between the collar 56 and inflatable member 54. As the movement of the disk 44 is relatively slight and the tubular connection 62 relatively long, movement of the disk will flex the connection very slightly. The disk 44 may be retained against rotation within the chuck and move in a direction to open collet by means similar to those shown in Fig. 2.

The modified form of the invention shown in Fig. 4 is similar to that shown in Fig. 3 except for the connection 70 to admit air or gas under pressure to the inflatable member 72. In this form of the invention a supply nipple 70 for the inflatable member 72 is extended to the outside surface of the body member so that a supply connection can be attached temporarily thereto whenever it is desired to inflate the member 72. Within the nipple 70 is a self-closing valve 74 to retain the pressure within the member 72 until the valve 74 is manually opened.

I claim as my invention:

1. A collet chuck closing means comprising a rotatable body member, a collet member therein, a disk mounted on the inner end of said collet member within the body member, an inflatable member within said body member and means to admit fluid under pressure to said inflatable member during rotation of said chuck to force said disk and collet member toward closed position.

2. A collet chuck closing means comprising, a rotatable body member, a collet member extending therein, a disk within said body member and attached to the inner end of said collet member, an inflatable member within said body member having a portion thereof in contact with said disk, and means to admit fluid under pressure to said inflatable member during rotation of said chuck to force said disk in a direction to move said collet member to its closed position.

3. A collet chuck closing means comprising a rotatable body member, a collet member extending therein, a disk within said body member and adjustably attached to the inner end of said collet member, an annular inflatable member within said body member disposed between said disk and a wall of said body member, and means to admit fluid under pressure to within said inflatable member during rotation of said chuck, to force said disk in a direction to move said collet to its closed position.

4. A collet chuck closing means comprising a rotatable body member, a collet member extending therein, a disk within said body member and attached to the inner end of said collet member, an annular inflatable member within said body member surrounding said collet member and disposed between said disk and a wall of said body member, and means to admit fluid under pressure to within said inflatable member during rotation of said chuck to force said disk in a direction to move said collet member to its closed position.

5. A collet chuck closing means comprising a rotatable body member, a collet member extending therein, a disk within said body member and attached to the inner end of said collet member, an annular inflatable member within said body member surrounding said collet member and disposed between said disk and a wall of said body member, a collar rotatably mounted on said body member, a fluid supply connection to said collar permitting continuous admission of fluid under pressure to said inflatable bag, and pressure tight conduits between said collar and said inflatable member during rotation of said chuck, whereby when an under pressure is admitted to said inflatable member said disk will be forced in a direction to move said collet member to its closed position.

ALBERT E. CHURCH.

REFERENCES CITED

The following references are of record in the file of this patent:

UNITED STATES PATENTS

| Number | Name | Date |
|---|---|---|
| 1,851,723 | Neidow | Mar. 29, 1932 |
| 2,267,815 | Bush | Dec. 30, 1941 |
| 2,393,458 | Cook | Jan. 22, 1946 |
| 2,428,496 | Mead | Oct. 7, 1947 |
| 2,500,383 | Sadler et al. | Mar. 14, 1950 |
| 2,509,673 | Church | May 30, 1950 |